Patented Jan. 8, 1952

2,581,382

UNITED STATES PATENT OFFICE 2,581,382

ESTERS OF ALPHA-HALOGEN CARBOXY ACIDS WITH OXYALKYLATED PHENOL-ALDEHYDE RESINS

Melvin De Groote, University City, and Bernhard Keiser, Webster Groves, Mo., assignors to Petrolite Corporation, Ltd., Wilmington, Del., a corporation of Delaware No Drawing. Application December 13, 1948,
Serial No. 65,081

8 Claims. (Cl. 260—53)

The present invention is concerned with certain new chemical products, compounds, or compositions which have useful application in various arts. This invention is a continuation-in-part of our copending application Serial No. 726,205, filed February 3, 1947, and now abandoned. It includes methods or procedures for manufacturing said new chemical products, compounds, or compositions, as well as the products, compounds, or compositions themselves. Said new compositions are esters of an alpha-halogen monocarboxylic acid having not over 6 carbon atoms and hydrophile hydroxylated synthetic products; said hydrophile synthetic products being oxyalkylation products of (A) An alpha-beta alkylene oxide having not more than 4 carbon atoms and selected from the class consisting of ethylene oxide, propylene oxide, butylene oxide, glycide, and methylglycide; and (B) An oxyalkylation-susceptible, fusible, organic solvent-soluble, water-insoluble, phenol-aldehyde resin; said resin being derived by reaction between a difunctional monohydric phenol and an aldehyde having not over 8 carbon atoms and reactive towards said phenol; said resin being formed in the substantial absence of trifunctional phenols; said phenol being of the formula:

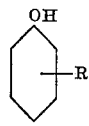

in which R is a hydrocarbon radical having at least 4 and not more than 12 carbon atoms and substituted in the 2, 4, 6 position; said oxyalkylated resin being characterized by the introduction into the resin molecule of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

Although the herein described products have a number of industrial applications, they are of particular value for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion. This specific application is described and claimed in our copending application, Serial No. 65,080, filed December 13, 1948, and now Patent 2,542,000, granted February 20, 1951. The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles such as sewage, coal washing waste water, and various trade wastes and the like; as germicides, insecticides, emulsifying agents, as, for example, for cosmetics, spray oils, water-repellent textile finishes; as lubricants, etc.

The oxyalkylated resins, used to provide the alcoholic radical of the new esters, are described in our Patents 2,499,370, granted March 7, 1950, and 2,542,000, granted February 20, 1951, and reference is made to those patents for a description of the phenol-aldehyde resins used to produce the alcoholic products. For specific examples of the resins, reference is made to Examples 1a through 103a of Patent 2,499,370. For examples of oxyalkylated products derived from these resins reference is made to the tables in columns 31 through 46 of Patent 2,542,000.

The herein contemplated total or partial esters are derived from alpha halogen monocarboxylic acids having not over 6 carbon atoms. Typical acids exemplifying this class are chloroacetic, dichloroacetic, bromoacetic, alpha bromobutyric, etc. Needless to say that our preference is to employ either the acids themselves or the acyl chlorides.

It is our preference to use chloroacetic acid for the reason that it is cheap and particularly reactive. Chloroacetyl chloride is a preferred reactant from the standpoint of reactivity but is objectionable for two reasons, one being that in eliminating hydrochloric acid in the reaction there is a tendency to cause corrosion of the apparatus, unless especially designed, and secondly, this reactant is comparatively expensive. However, except for these two objections it may be considered as a preferred reactant. Our preference is to use any alpha-halogen carboxylic acid of not over 6 carbon atoms. Other suitable acids include alpha-chloropropionic acid, alpha-chlorobutyric acid, alpha-bromoisocaproic acid, bromoacetic acid, iodoacetic acid, etc. The acyl halides of these acids, of course, may be employed.

In many instances the alpha-halogenated acylchloride is as readily available as the alpha-halogen acid. The reason for this is the fact that it is difficult to halogenate an acid so as to introduce the halogen in an alpha position, but an acyl halide reacts more rapidly and the halogen enters the alpha position due to the negative effect of both the chlorine atom and the carbonyl atom. Under such circumstances where the alpha-chloroacyl acid is available there is no reason, of course, to hydrolyze an acyl chloride to the acid in order to use the acid instead.

*Example 1c*

The method employed, whether on a large scale or a laboratory scale, is susceptible to use in connection with resins of the kind described where all, or substantially all, the phenolic hydroxyls have been changed into alkanol hydroxyl radicals or have been oxyalkylated further. In other words, such procedure is perfectly satisfactory for a compound obtained by treating a resin of the kind described under the heading of Example 1a, et seq., with ethylene oxide or the like, on an equimolar ratio based on each phenolic hydroxyl present. In most of the examples, and particularly since such examples exemplify reagents herein employed, more than one mole of ethylene oxide has been introduced per phenolic hydroxyl. See Examples 1b et seq. of Patent 2,499,370.

We prefer to use a glass resin pot of the kind decribed under the heading of Example 1a of Patent 2,499,370. Such resin pot may vary in size, for instance, so as to have a capacity varying from 500 to 1500 cc., with 1000 or 1250 cc., most convenient. The upper part of the apparatus is the same as previously described, to wit, it includes a stirring device, a thermometer well, a separatory funnel or other means of adding reactants, and a water-cooled reflux condenser equipped with a phase-separating device so that water of reaction or condensation can be removed. The resin pot is heated, as before, with a glass fiber electric heater. The reaction can be conducted with or without the use of a catalyst such as para-toluene sulfonic acid. We prefer to use such a catalyst. The reaction is generally complete within 4 to 6 hours and the completeness of reaction can be judged by the disappearance of the carboxyl acid value, or by the reduction of hydroxyl value in the acid mass, or by measuring the water of reaction obtained in the condenser trap. Such value, however, is apt to run in excess of theoretical.

All reactants employed, such as chloroacetic acid or para-toluene sulfonic acid, were of technical grade. The xylene employed as a solvent was of the technical grade.

| | Grams |
|---|---|
| Xylene-containing oxyalkylated resin 104b of Patent 2,542,000 | 800 |
| Chloroacetic acid | 198 |
| Xylene | 534 |
| Para-toluene sulfonic acid | 53 |

The above ratios are equimolar. The mixture was heated with stirring under reflux for 6 hours at a temperature of 145° C., during which time 35 cc. of water were collected in the phase-separating trap, the xylene being returned to the reaction mixture. This water was in excess of theoretical. A small portion of this product was poured in a thin film on a glass plate and allowed to stand at room temperature for several days so as to insure evaporation of the xylene. Examination of the solvent-free product showed it was amber colored, viscous and tacky. A portion of the latter product was removed by a glass stirring rod to a test tube which was then partly filled with distilled water. In shaking the tube some foaming was observed and the product was found to exhibit only limited hydrophile properties.

The procedure employed was used in all succeeding experiments without change, except as noted in regard to reactants, water evolved, etc.

*Example 2c*

The apparatus described in Example 1c was charged with

| | Grams |
|---|---|
| Xylene-containing oxyalkylated resin 105b of Patent 2,542,000 | 600 |
| Chloroacetic acid | 85.6 |
| Xylene | 400 |
| Para-toluene sulfonic acid | 40 |

The mixture was heated at reflux with stirring over a period of about 6.5 hours at a temperature of 142° C., during which time 22.4 grams of water were collected. The product, after removal of solvent, was an amber, tacky, semi-solid, slightly soluble in water, with some foaming.

*Example 3c*

The apparatus described in Example 1c was charged with

| | Grams |
|---|---|
| Xylene-containing oxyalkylated resin 106b of Patent 2,542,000 | 600 |
| Chloroacetic acid | 73.0 |
| Xylene | 400 |
| Para-toluene sulfonic acid | 40 |

The mixture was heated at reflux with stirring over a period of about 5.5 hours at a temperature of 140° C., during which time 21.6 grams of water were collected. The product, after removal of solvent, was a clear, light brown, sticky syrup, fairly soluble in water, with considerable foaming.

*Example 4c*

The apparatus described in Example 1c was charged with

| | Grams |
|---|---|
| Xylene-containing oxyalkylated resin 107b of Patent 2,542,000 | 600 |
| Chloroacetic acid | 56.8 |
| Xylene | 400 |
| Para-toluene sulfonic acid | 40 |

The mixture was heated at reflux with stirring over a period of about 5.5 hours, at a temperature of 142° C., during which time 11.4 grams of water were collected. The product, after removal of solvent, was a clear, yellow-brown syrup, well soluble in water, with considerable foaming.

*Example 5c*

The apparatus described in Example 1c was charged with

| | Grams |
|---|---|
| Xylene-containing oxyalkylated resin 108b of Patent 2,542,000 | 600 |
| Chloroacetic acid | 46.8 |
| Xylene | 400 |
| Para-toluene sulfonic acid | 40 |

The mixture was heated at reflux with stirring over a period of about 6 hours at a temperature of 140° C., during which time 11.2 grams of water were collected. The product, after removal of solvent, was a clear, yellow-brown sticky syrup, very soluble in water, with heavy foaming.

Example 6c

The apparatus described in Example 1c was charged with

| | Grams |
|---|---|
| Xylene-containing oxyalkylated resin 109b of Patent 2,542,000 | 600 |
| Chloroacetic acid | 152 |
| Xylene | 400 |
| Para-toluene sulfonic acid | 40 |

The mixture was heated at reflux with stirring over a period of about 6 hours at a temperature of 140° C., during which time 36 grams of water were collected. The product, after removal of solvent, was an amber, sticky, viscous semi-solid, slightly soluble in water, with some foaming.

Example 7c

The apparatus described in Example 1c was charged with

| | Grams |
|---|---|
| Xylene-containing oxyalkylated resin 110b of Patent 2,542,000 | 600 |
| Chloroacetic acid | 111.7 |
| Xylene | 400 |
| Para-toluene sulfonic acid | 40 |

The mixture was heated at reflux with stirring over a period of about 5 hours, at a temperature of 142° C., during which time 26 grams of water were collected. The product, after removal of solvent, was a yellow, sticky, viscous liquid, slightly soluble in water, with some foaming.

Example 8c

The apparatus described in Example 1c was charged with

| | Grams |
|---|---|
| Xylene-containing oxyalkylated resin 111b of Patent 2,542,000 | 600 |
| Chloroacetic acid | 62.4 |
| Xylene | 400 |
| Para-toluene sulfonic acid | 40 |

The mixture was heated at reflux with stirring over a period of about 7 hours at a temperature of 141° C., during which time 15.2 grams of water were collected. The product, after removal of solvent, was a brown, sticky, semi-fluid mass, slightly soluble in water, with little foaming.

Example 9c

The apparatus described in Example 1c was charged with

| | Grams |
|---|---|
| Xylene-containing oxyalkylated resin 112b of Patent 2,542,000 | 600 |
| Chloroacetic acid | 50.0 |
| Xylene | 400 |
| Para-toluene sulfonic acid | 40 |

The mixture was heated at reflux with stirring over a period of about 7 hours, at a temperature of 142° C., during which time 11.0 grams of water were collected. The product, after removal of solvent, was an amber, sticky, semi-fluid mass, slightly soluble in water, with a fair amount of foaming.

Example 10c

The apparatus described in Example 1c was charged with

| | Grams |
|---|---|
| Xylene-containing oxyalkylated resin 113b of Patent 2,542,000 | 600 |
| Chloroacetic acid | 39.6 |
| Xylene | 400 |
| Para-toluene sulfonic acid | 40 |

The mixture was heated at reflux with stirring over a period of about 5.5 hours at a temperature of 137° C., during which time 29 grams of water were collected. The product, after removal of solvent, was a brown, sticky syrup, fairly soluble in water with considerable foaming.

Example 11c

The apparatus described in Example 1c was charged with

| | Grams |
|---|---|
| Xylene-containing oxyalkylated resin 114b of Patent 2,542,000 | 600 |
| Chloroacetic acid | 163.5 |
| Xylene | 400 |
| Para-toluene sulfonic acid | 40 |

The mixture was heated at reflux with stirring over a period of about 5 hours at a temperature of 143° C., during which time 39 grams of water were collected. The product, after removal of solvent, was a thick, amber syrup, little soluble in water with little foaming.

Example 12c

The apparatus described in Example 1c was charged with

| | Grams |
|---|---|
| Xylene-containing oxyalkylated resin 115b of Patent 2,542,000 | 600 |
| Chloroacetic acid | 71.4 |
| Xylene | 400 |
| Para-toluene sulfonic acid | 40 |

The mixture was heated at reflux with stirring over a period of about 6.5 hours at a temperature of 144° C., during which time 17.8 grams of water were collected. The product, after removal of solvent, was a viscous, yellow syrup, somewhat soluble in water with some foaming.

Example 13c

The apparatus described in Example 1c was charged with

| | Grams |
|---|---|
| Xylene-containing oxyalkylated resin 116b of Patent 2,542,000 | 600 |
| Chloroacetic acid | 60.2 |
| Xylene | 400 |
| Para-toluene sulfonic acid | 40 |

The mixture was heated at reflux with stirring over a period of about 6.5 hours, at a temperature of 144° C., during which time 11.8 grams of water were collected. The product, after removal of solvent, was a yellowish, thick, sticky syrup, fairly soluble in water with a fair amount of foaming.

Example 14c

The apparatus described in Example 1c was charged with

| | Grams |
|---|---|
| Xylene-containing oxyalkylated resin 117b of Patent 2,542,000 | 600 |
| Chloroacetic acid | 49.8 |
| Xylene | 400 |
| Para-toluene sulfonic acid | 40 |

The mixture was heated at reflux with stirring over a period of about 6.5 hours at a temperature of 142° C., during which time 9.2 grams of water were collected. The product, after removal of solvent, was a clear, yellow-brown sticky syrup, slightly soluble in water with a fair amount of foaming.

*Example 15c*

The apparatus described in Example 1c was charged with

| | Grams |
|---|---|
| Xylene-containing oxyalkylated resin 118b of Patent 2,542,000 | 600 |
| Chloroacetic acid | 42.4 |
| Xylene | 400 |
| Para-toluene sulfonic acid | 40 |

The mixture was heated at reflux with stirring over a period of about 4.5 hours at a temperature of 144° C., during which time 8 grams of water were collected. The product, after removal of solvent, was a clear, light brown, semi-fluid syrup, well soluble in water with good foaming.

*Example 16c*

The apparatus described in Example 1c was charged with

| | Grams |
|---|---|
| Xylene-containing oxyalkylated resin 119b of Patent 2,542,000 | 600 |
| Chloroacetic acid | 153 |
| Xylene | 400 |
| Para-toluene sulfonic acid | 40 |

The mixture was heated at reflux with stirring over a period of about 5 hours at a temperature of 144° C., during which time 36.4 grams of water were collected. The product, after removal of solvent, was an amber, viscous, semi-solid little soluble in water with little foaming.

*Example 17c*

The apparatus described in Example 1c was charged with

| | Grams |
|---|---|
| Xylene-containing oxyalkylated resin 120b of Patent 2,542,000 | 600 |
| Chloroacetic acid | 113.5 |
| Xylene | 400 |
| Para-toluene sulfonic acid | 40 |

The mixture was heated at reflux with stirring over a period of about 6 hours at a temperature of 143°% C., during which time 27 grams of water were collected. The product, after removal of solvent, was a yellow, thick, semi-solid, little soluble in water with little foaming.

*Example 18c*

The apparatus described in Example 1c was charged with

| | Grams |
|---|---|
| Xylene-containing oxyalkylated resin 121b of Patent 2,542,000 | 600 |
| Chloroacetic acid | 62.8 |
| Xylene | 400 |
| Para-toluene sulfonic acid | 40 |

The mixture was heated at reflux with stirring over a period of about 4 hours at a temperature of 141° C., during which time 13 grams of water were collected. The product, after removal of solvent, was a viscous, amber fluid, somewhat soluble in water with some foaming.

*Example 19c*

The apparatus described in Example 1c was charged with

| | Grams |
|---|---|
| Xylene-containing oxyalkylated resin 122b of Patent 2,542,000 | 600 |
| Chloroacetic acid | 51.2 |
| Xylene | 400 |
| Para-toluene sulfonic acid | 40 |

The mixture was heated at reflux with stirring over a period of about 6.5 hours at a temperature of 143° C., during which time 10.2 grams of water were collected. The product, after removal of solvent, was a yellowish, viscous liquid, fairly soluble in water with some foaming.

*Example 20c*

The apparatus described in Example 1c was charged with

| | Grams |
|---|---|
| Xylene-containing oxyalkylated resin 123b of Patent 2,542,000 | 600 |
| Chloroacetic acid | 42.4 |
| Xylene | 400 |
| Para-toluene sulfonic acid | 40 |

The mixture was heated at reflux with stirring over a period of about 6 hours at a temperature of 143° C., during which time 12.2 grams of water were collected. The product, after removal of solvent, was an amber semi-solid, fairly soluble in water with some foaming.

*Example 21c*

The apparatus described in Example 1c was charged with

| | Grams |
|---|---|
| Xylene-containing oxyalkylated resin 124b of Patent 2,542,000 | 600 |
| Chloroacetic acid | 205 |
| Xylene | 400 |
| Para-toluene sulfonic acid | 40 |

The mixture was heated at reflux with stirring over a period of about 5 hours at a temperature of 142° C., during which time 49 grams of water were collected. The product, after removal of solvent, was a yellowish semi-fluid, little soluble in water with little foaming.

*Example 22c*

The apparatus described in Example 1c was charged with

| | Grams |
|---|---|
| Xylene-containing oxyalkylated resin 125b of Patent 2,542,000 | 600 |
| Chloroacetic acid | 147.5 |
| Xylene | 400 |
| Para-toluene sulfonic acid | 40 |

The mixture was heated at reflux with stirring over a period of about 6 hours at a temperature of 144° C., during which time 35.1 grams of water were collected. The product, after removal of solvent, was an amber, viscous liquid, slightly soluble in water with little foaming.

*Example 23c*

The apparatus described in Example 1c was charged with

| | Grams |
|---|---|
| Xylene-containing oxyalkylated resin 126b of Patent 2,542,000 | 600 |
| Chloroacetic acid | 75.6 |
| Xylene | 400 |
| Para-toluene sulfonic acid | 40 |

The mixture was heated at reflux with stirring over a period of about 6 hours at a temperature of 140° C., during which time 16 grams of water were collected. The product, after removal of solvent, was a turbid brown, sticky syrup, somewhat soluble in water with a fair amount of foaming.

*Example 24c*

The apparatus described in Example 1c was charged with

| | Grams |
|---|---|
| Xylene-containing oxyalkylated resin 127b of Patent 2,542,000 | 600 |
| Chloroacetic acid | 39.6 |
| Xylene | 400 |
| Para-toluene sulfonic acid | 40 |

The mixture was heated at reflux with stirring over a period of about 5 hours at a temperature of 144° C., during which time 16 grams of water were collected. The product, after removal of solvent was a clear, brown, sticky syrup, very soluble in water with much foaming.

*Example 25c*

The apparatus described in Example 1c was charged with

| | Grams |
|---|---|
| Xylene-containing oxyalkylated resin 128b of Patent 2,542,000 | 600 |
| Chloroacetic acid | 47.2 |
| Xylene | 400 |
| Para-toluene sulfonic acid | 40 |

The mixture was heated at reflux with stirring over a period of about 6 hours at a temperature of 143° C., during which time 16.2 grams of water were collected. The product, after removal of solvent, was a dark brown, thick, sticky syrup, very soluble in water, with much foaming.

*Example 26c*

The apparatus described in Example 1c was charged with

| | Grams |
|---|---|
| Xylene-containing oxyalkylated resin 129b of Patent 2,542,000 | 600 |
| Chloroacetic acid | 145.8 |
| Xylene | 400 |
| Para-toluene sulfonic acid | 40 |

The mixture was heated at reflux with stirring over a period of about 6 hours at a temperature of 143° C., during which time 34.5 grams of water were collected. The product, after removal of solvent, was a yellow-brown semi-solid, little soluble in water with little foaming.

*Example 27c*

The apparatus described in Example 1c was charged with

| | Grams |
|---|---|
| Xylene-containing oxyalkylated resin 130b of Patent 2,542,000 | 600 |
| Chloroacetic acid | 109 |
| Xylene | 400 |
| Para-toluene sulfonic acid | 40 |

The mixture was heated at reflux with stirring over a period of about 5 hours at a temperature of 142 C., during which time 26 grams of water were collected. The product, after removal of solvent, was a viscous yellow-brown fluid, slightly soluble in water with little foaming.

*Example 28c*

The apparatus described in Example 1c was charged with

| | Grams |
|---|---|
| Xylene-containing oxyalkylated resin 131b of Patent 2,542,000 | 600 |
| Chloroacetic acid | 66.2 |
| Xylene | 400 |
| Para-toluene sulfonic acid | 40 |

The mixture was heated at reflux with stirring over a period of about 4 hours at a temperature of 145° C., during which time 8.6 grams of water were collected. The product, after removal of solvent, was a yellowish semi-solid, fairly soluble in water with some foaming.

*Example 29c*

The apparatus described in Example 1c was charged with

| | Grams |
|---|---|
| Xylene-containing oxyalkylated resin 132b of Patent 2,542,000 | 600 |
| Chloroacetic acid | 50.0 |
| Xylene | 400 |
| Para-toluene sulfonic acid | 40 |

The mixture was heated at reflux with stirring over a period of about 5.5 hours at a temperature of 142° C., during which time 10.4 grams of water were collected. The product, after removal of solvent, was a viscous yellow fluid, fairly soluble in water with some foaming.

*Example 30c*

The apparatus described in Example 1c was charged with

| | Grams |
|---|---|
| Xylene-containing oxyalkylated resin 133b of Patent 2,542,000 | 600 |
| Chloroacetic acid | 41.6 |
| Xylene | 400 |
| Para-toluene sulfonic acid | 40 |

The mixture was heated at reflux with stirring over a period of about 2.5 hours at a temperature of 154° C., during which time 5.6 grams of water were collected. The product, after removal of solvent, was an amber semi-fluid, quite soluble in water with considerable foaming.

*Example 31c*

The apparatus described in Example 1c was charged with

| | Grams |
|---|---|
| Xylene-containing oxyalkylated resin 135b of Patent 2,542,000 | 611 |
| Chloroacetic acid | 94.5 |
| Xylene | 400 |
| Para-toluene sulfonic acid | 40 |

The mixture was heated at reflux with stirring over a period of about 6 hours at a temperature of 141° C., during which time 20.6 grams of water were collected. The product, after removal of solvent, was a yellowish viscous liquid, slightly soluble in water with some foaming.

*Example 32c*

The apparatus described in Example 1c was charged with

| | Grams |
|---|---|
| Xylene-containing oxyalkylated resin 137b of Patent 2,542,000 | 790 |
| Chloroacetic acid | 70.9 |
| Xylene | 400 |
| Para-toluene sulfonic acid | 40 |

The mixture was heated at reflux with stirring over a period of about 6 hours at a temperature of 144° C., during which time 20.0 grams of water were collected. The product, after removal of solvent, was an amber, thick fluid, fairly soluble in water with considerable foaming.

*Example 33c*

The apparatus described in Example 1c was charged with

| | Grams |
|---|---|
| Xylene-containing oxyalkylated resin 139b of Patent 2,542,000 | 720 |
| Chloroacetic acid | 118.2 |
| Xylene | 480.6 |
| Para-toluene sulfonic acid | 48.1 |

The mixture was heated at reflux with stirring over a period of about 6 hours at a temperature of 138° C., during which time 17 grams of water were collected. The product, after removal of solvent, was an amber, sticky liquid, slightly soluble in water with little foaming.

*Example 34c*

The apparatus described in Example 1c was charged with

| | Grams |
|---|---|
| Xylene-containing oxyalkylated resin 140b of Patent 2,542,000 | 720 |
| Chloroacetic acid | 90 |
| Xylene | 480.6 |
| Para-toluene sulfonic acid | 48.1 |

The mixture was heated at reflux with stirring over a period of about 8.5 hours at a temperature of 140° C., during which time 16 grams of water were collected. The product, after removal of solvent, was a yellow-brown, viscous liquid, somewhat soluble in water with some foaming.

*Example 35c*

The apparatus described in Example 1c was charged with

| | Grams |
|---|---|
| Xylene-containing oxyalkylated resin 141b of patent 2,542,000 | 720 |
| Chloroacetic acid | 70.2 |
| Xylene | 480.6 |
| Para-toluene sulfonic acid | 48.1 |

The mixture was heated at reflux with stirring over a period of about 6 hours at a temperature of 141° C., during which time 16.5 grams of water were collected. The product, after removal of solvent, was an amber, sticky semi-fluid, fairly soluble in water with some foaming.

*Example 36c*

The apparatus described in Example 1c was charged with

| | Grams |
|---|---|
| Xylene-containing oxyalkylated resin 142b of Patent 2,542,000 | 720 |
| Chloroacetic acid | 57.5 |
| Xylene | 480.6 |
| Para-toluene sulfonic acid | 48.1 |

The mixture was heated at reflux with stirring over a period of about 6 hours at a temperature of 144° C., during which time 16 grams of water were collected. The product, after removal of solvent, was a brownish amber semi-liquid, well soluble in water with considerable foaming.

*Example 37c*

The apparatus described in Example 1c was charged with

| | Grams |
|---|---|
| Xylene-containing oxyalkylated resin 143b of Patent 2,542,000 | 720 |
| Chloroacetic acid | 48.6 |
| Xylene | 480.6 |
| Para-toluene sulfonic acid | 48.1 |

The mixture was heated at reflux with stirring over a period of about 6 hours at a temperature of 141° C., during which time 11 grams of water were collected. The product, after removal of solvent, was a yellowish semi-fluid, very soluble in water with considerable foaming.

*Example 38c*

The apparatus described in Example 1c was charged with

| | Grams |
|---|---|
| Xylene-containing oxyalkylated resin 146b of Patent 2,542,000 | 754.6 |
| Chloroacetic acid | 75.6 |
| Xylene | 160 |
| Para-toluene sulfonic acid | 32 |

The mixture was heated at reflux with stirring over a period of about 6 hours at a temperature of 158° C., during which time 15 grams of water were collected. The product, after removal of solvent, was an amber, sticky, semi-fluid mass, somewhat soluble in water with some foaming.

*Example 39c*

The apparatus described in Example 1c was charged with

| | Grams |
|---|---|
| Xylene-containing oxyalkylated resin 147b of Patent 2,542,000 | 638 |
| Chloroacetic acid | 51.9 |
| Xylene | 220 |
| Para-toluene sulfonic acid | 27.5 |

The mixture was heated at reflux with stirring over a period of about 6 hours at a temperature of 145° C., during which time 9.5 grams of water were collected. The product, after removal of solvent, was a brownish-yellow, sticky syrup, quite soluble in water with fair foaming.

Attention is directed to the following fact: The oxyalkylated resins herein used as intermediate materials for further reaction to provide more complex derivatives are characterised by having certain minimum hydrophile properties, as described, and it is particularly desirable that these hydrophile properties be sufficient to produce an emulsion when mixed with xylene in the manner previously described.

Needless to say, when a derivative is formed, such derivative may have somewhat altered hydrophile character, or, stated another way, may have an altered hydrophobe-hydrophile balance. If an ester is prepared from a high molal acid, hydrophile character is increased. If such ester is prepared from sulfo-benzoic acid or the like, the hydrophile character may be enhanced. This is also true in even more complicated derivatives, such as the introduction of a quaternary nitrogen atom radical. In the formation of esters, the hydrophobe-hydrophile balance is effected by the factor of whether one prepare a complete or partial ester. In a general way, although the herein described compounds are valuable for various purposes, particularly demulsification, even though the hydrophobe character may be increased somewhat and the hydrophile character decreased, yet when the same test is applied to the derivatives as is applied to the oxyalkylated resins, and when such derivatives also show at least such minimum hydrophile character, they are unquestionably most advantageous, particularly for use as demulsifiers. Thus, in the hereto appended claims, in pointing out the invention in such specific character, at least part of the claims are directed to the derivatives in which the derivative meets the same final test in regard to the production of a xylene emulsion. Stated another way, the final derivative must be at least as hydrophile, or more so, than the minimum requirement for the oxyalkylated resin, as defined.

Having thus described our invention, what we claim and desire to secure by Letters Patent is:

1. An ester in which the acyl radical is that of an alpha-halogen monocarboxylic acid having not over 6 carbon atoms and composed of carbon, hydrogen, oxygen and halogen and the alcoholic radical is that of certain hydrophile polyhydric synthetic products; said hydrophile synthetic products being oxyalkylation products of (A) an alpha-beta alkylene oxide having not more than 4 carbon atoms and selected from the class consisting of ethylene oxide, propylene oxide, butylene oxide, glycide, and methylglycide, and (B) an oxyalkylation-susceptible, fusible, organic solvent-soluble, water-insoluble, phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula

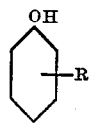

in which R is a hydrocarbon radical having at least 4 and not more than 2 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus.

2. A choloroacetate of certain hydrophile polyhydric synthetic products; said hydrophile synthetic products being oxalkylation products of (A) an alpha-beta alkylene oxide having not more than 4 carbon atoms and selected from the class consisting of ethylene oxide, propylene oxide, butylene oxide, glycide, and methylglycide, and (B) an oxyalkylation susceptible, fusible, organic solvent-soluble, water-insoluble phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

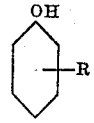

in which R is a hydrocarbon radical having at least 4 and not more than 12 carbon atoms and substituted in one of the positions ortho and para; said oxyalkylated resin being characterized by the introduction into the resin molecule at the phenolic hydroxyls of a plurality of divalent radicals having the formula $(R_1O)_n$, in which $R_1$ is a member selected from the class consisting of ethylene radicals, propylene radicals, butylene radicals, hydroxypropylene radicals, and hydroxybutylene radicals, and $n$ is a numeral varying from 1 to 20; with the proviso that at least 2 moles of alkylene oxide be introduced for each phenolic nucleus; and with the final proviso that the hydrophile properties of the ester as well as the oxyalkylated resin in an equal weight of xylene are sufficient to produce an emulsion when said xylene solution is shaken vigorously with one to three volumes of water.

3. A chloroacetate of certain hydrophile polyhydric synthetic products; said hydrophile synthetic products being oxyethylation products of (A) ethylene oxide, and (B) an oxyethylation-susceptible, fusible, organic solvent-soluble, water-insoluble phenol-aldehyde resin; said resin being derived by reaction between a difunctional monohydric phenol and an aldehyde having not over 8 carbon atoms and having one functional group reactive towards said phenol; said resin being formed in the substantial absence of phenols of functionality greater than two; said phenol being of the formula:

in which R is a hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula $(C_2H_4O)_n$; wherein $n$ is a numeral varying from 1 to 20; with the proviso that at least 2 moles of ethylene oxide be introduced for each phenolic nucleus; and with the final proviso that the hydrophile properties of the ester as well as the oxyethylated resin in an equal weight of xylene are sufficient to produce an emulsion when said xylene solution is shaken vigorously with one to three volumes of water.

4. A chloroacetate of certain hydrophile polyhydric synthetic products; said hydrophile synthetic products being oxyethylation products of (A) ethylene oxide, and (B) an oxyethylation-susceptible, fusible, organic solvent-soluble, water-insoluble, low-stage phenol-aldehyde resin having an average molecular weight corresponding to at least 3 and not over 7 phenolic nuclei per resin molecule; said resin being derived by reaction between a difunctional monohydric phenol and formaldehyde; said resin being formed in the substantial absence of phenols of functionality greater than two; said phenol being of the formula:

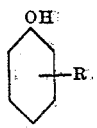

in which R is an aliphatic hydrocarbon radical having at least 4 and not more than 12 carbon atoms and substituted in one of the positions ortho and para; said oxyethylated resin being characterized by the introduction into the resin molecule at the phenolic hydroxyls of a plurality of divalent radicals having the formula

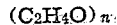

wherein $n$ is a numeral varying from 1 to 20; with the proviso that at least 2 moles of ethylene oxide be introduced for each phenolic nucleus; and with the final proviso that the hydrophile properties of the ester as well as the oxyalkylated resin in an equal weight of xylene are sufficient to produce an emulsion when said xylene solution is shaken vigorously with one to three volumes of water.

5. The product of claim 4, wherein R is substituted in the para position.

6. The product of claim 4, wherein R is a butyl radical substituted in the para position.

7. The product of claim 4, wherein R is an amyl radical substituted in the para position.

8. The product of claim 4, wherein R is a nonyl radical substituted in the para position.

MELVIN DE GROOTE.
BERNHARD KEISER.

REFERENCES CITED

The following references are of record in the file of this patent:

UNITED STATES PATENTS

| Number | Name | Date |
| --- | --- | --- |
| 2,169,991 | Rosenblum | Aug. 15, 1939 |
| 2,268,947 | Krumbhaar | Jan. 6, 1942 |
| 2,454,541 | Bock et al. | Nov. 23, 1948 |
| 2,499,365 | De Groote | Mar. 7, 1950 |